United States Patent

Tanaka

[11] Patent Number: 5,832,326
[45] Date of Patent: Nov. 3, 1998

[54] METHOD AND APPARATUS FOR ACCOMMODATING A LENS IN A ZOOM COMPACT CAMERA

[75] Inventor: Hitoshi Tanaka, Tokyo, Japan

[73] Assignee: Asahi Kogaku Kogyo Kabushiki Kaisha, Tokyo, Japan

[21] Appl. No.: 919,235

[22] Filed: Aug. 28, 1997

[30] Foreign Application Priority Data

Sep. 11, 1996 [JP] Japan .................................. 8-240778

[51] Int. Cl.⁶ .................................................. G03B 17/04
[52] U.S. Cl. ........................................ 396/349; 396/448
[58] Field of Search ............................... 396/72, 79, 349, 396/448

[56] References Cited

U.S. PATENT DOCUMENTS 2,126,300  8/1938  Wittel ...................................... 396/349
5,598,241  1/1997  Nomura et al. ...................... 396/349 X

*Primary Examiner*—W. B. Perkey
*Attorney, Agent, or Firm*—Greenblum & Bernstein, P.L.C.

[57] ABSTRACT

A lens accommodating method in a zoom compact camera having inner and outer lens barrels which are moved between a retracted position and an advanced position includes the steps of retracting the inner lens barrel into the outer lens barrel before the inner and outer lens barrels reach the retracted position when the inner and outer lens barrels are moved from the advanced position toward the retracted position to thereby eliminate a step between the front ends of the inner and outer lens barrels in the optical axis direction, and moving the inner and outer lens barrels which are substantially flush with each other at the front ends thereof to the retracted position together. A lens accommodating apparatus is also disclosed.

7 Claims, 5 Drawing Sheets

METHOD AND APPARATUS FOR ACCOMMODATING A LENS IN A ZOOM COMPACT CAMERA

BACKGROUND OF THE INVENTION

1. Field of the Invention

The present invention relates to a lens accommodating method and apparatus in a zoom compact camera.

2. Description of the Related Art

In a known zoom compact camera, a plurality of concentrical movable lens barrels (feed lens barrels) are moved between an accommodated position (i.e., a retracted position) and an advanced position. In the accommodated position, the front surfaces of the lens barrels are flush. When the lens barrels are advanced forwardly in an optical axis direction, steps (differences in the axial length of projection of the lens barrels from the camera body) are produced between the front surfaces of the lens barrels. The steps increase as the lens barrels are advanced. In other words, the front surfaces of the lens barrels are only flush with each other at the accommodated position.

If the lens barrels are moved forward (advanced) from the accommodated position, an inner lens barrel is protruded from an outer lens barrel, whatever the axial displacements of the lens barrels may be. Consequently, when the lens barrels are moved from the advanced position to the accommodated position, the inner lens barrel can interfere with an external member, immediately before reaching the accommodated position. In particular, in some compact cameras in which the front surface of the lens barrel (lens barrels) is closed or opened by a sliding barrier, the sliding barrier is released from a locked state immediately before the lens barrels reach the accommodated position. In this type of compact camera, if the sliding barrier is forcedly closed, there is a possibility that the inner lens barrel interferes with the sliding barrier.

SUMMARY OF THE INVENTION

It is an object of the present invention to provide a lens accommodation method and apparatus in which an inner lens barrel is retracted into an outer lens barrel before the lens barrels reach the completely retracted position.

To achieve the object mentioned above, according to an aspect of the present invention, there is provided a lens accommodating method in a zoom compact camera having a plurality of concentric lens barrels which are moved between a retracted position and an advanced position. The method includes retracting an inner lens barrel into an outer lens barrel before the lens barrels reach the retracted position when the lens barrels are moved from the advanced position toward the retracted position to thereby eliminate a step between front ends of the lens barrels in an optical axis direction, lens barrel and the moving the inner and outer lens barrel, the front ends of which are substantially flush with each other, to the retracted position together.

If the camera is provided with a sliding barrier which slides to open or close the front ends of the lens barrels when the lens barrels are at the retracted position, it is preferable that the step eliminating step terminates at a position in which the sliding barrier cannot interfere with the innermost lens barrel when the sliding barrier is moved to a closed position before the lens barrels reach the retracted position.

According to another aspect of the present invention, a lens accommodating method in a zoom compact camera having an inner lens barrel and an outer lens barrel which are moved between a retracted position and an advanced position, including retracting the inner lens barrel into the outer lens barrel before the inner and outer lens barrels reach the retracted position when the inner and outer lens barrels are moved from the advanced position toward the retracted position to eliminate a step between front ends of the inner and outer lens barrels in an optical axis direction, lens barrel and the moving the inner and outer lens barrel, the front ends of which are substantially flush with each other, together to the retracted position.

According to still another aspect of the present invention, there is provided a lens accommodating apparatus having a plurality of concentric lens barrels including an inner lens barrel and an outer lens barrel. A cam ring including cam grooves which are adapted to control a movement of the lens barrels and move the lens barrels between a retracted position and an advanced position. The cam grooves include step eliminating sections in which, when the lens barrels are moved from the advanced position to the retracted position, the inner lens barrel is retracted into the outer lens barrel to eliminate a step between the front ends of the inner lens barrel and the outer lens barrel in an optical axis direction before the lens barrels reach the retracted position, and integral accommodation sections in which the inner lens barrel and the outer lens barrel are moved to the retracted position while keeping the front ends thereof substantially flush with each other.

The cam ring can be made of one of the lens barrels or can be made of a rotary member separate from the lens barrels.

According to yet another aspect of the present invention, a lens accommodating apparatus is provided having an inner lens barrel and an outer lens barrel. A cam ring is provided having cam grooves which are adapted to control movement of the inner lens barrel and outer lens barrel and move the inner and outer lens barrels between a retracted position and an advanced position. The cam grooves include step eliminating sections in which, when the inner and outer lens barrels are moved from the advanced position to the retracted position, the inner lens barrel is retracted into the outer lens barrel to eliminate a step between front ends of the inner lens barrel and the outer lens barrel in an optical axis direction before the inner lens barrel and the outer lens barrel reach the retracted position, and integral accommodation sections in which the inner lens barrel and the outer lens barrel are moved to the retracted position while keeping the front ends thereof substantially flush with each other.

The present disclosure relates to subject matter contained in Japanese Patent Application No. 08-240778 (filed on Sep. 11, 1996) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 6:
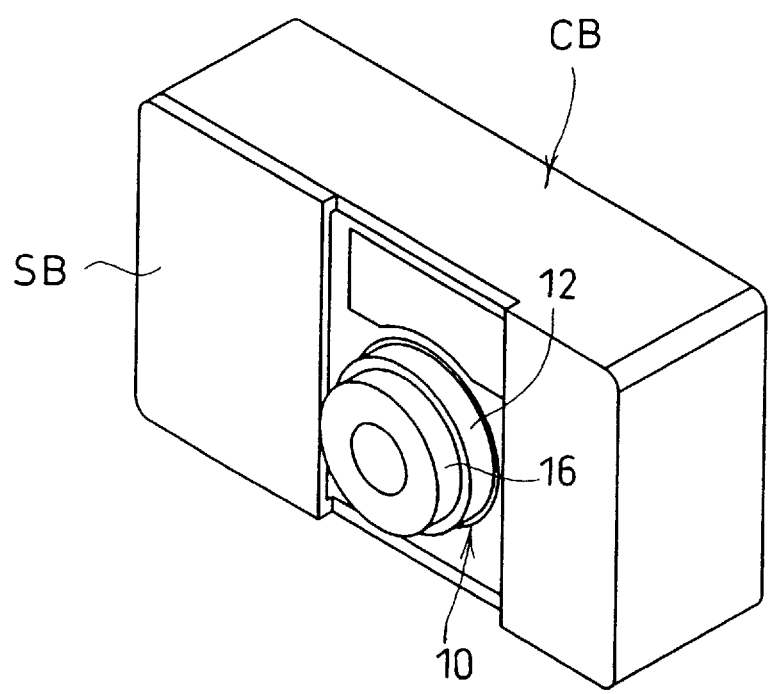
FIG. 6 is a perspective view of a zoom compact camera to which the present invention is applied.

As can be seen in FIG. 6, the embodiment of the present invention is applied to a zoom compact camera having a two-stage advancement type lens barrel 10. A camera body CB of the zoom compact camera is provided with a sliding barrier SB which slides laterally to close or open the front surface of the lens barrel 10.

The structure of the lens barrel 10 will be discussed below with reference to FIGS. 1 through 4.

The camera body CB includes a stationary ring 11 integral therewith, which is provided on the inner peripheral surface thereof with a female helicoid (internal thread) 11a. The female helicoid 11a is in mesh with a male helicoid (external thread) 12a formed on the outer peripheral surface of an outer lens barrel (element) (cam ring or drive ring) 12 which is fitted in the stationary ring 11.

The outer lens barrel 12 is provided with a spur gear 12b which is formed on a partial cut-away portion of the male helicoid 12a. The spur gear 12b is engaged by a zoom drive gear 13 which is rotatably supported by the stationary ring 11. The zoom drive gear 13 is driven by a zoom motor (not shown), so that when the zoom drive gear 13 is rotated, the outer lens barrel 12 is moved in an optical axis direction while being rotated, due to the screw- engagement between the male helicoid 12a and the female helicoid 11a.

The outer lens barrel 12 has a dual-cylinder structure of a substantially U-shaped section having an outer cylinder 12A and an inner cylinder 12B. The rear end of the outer lens barrel 12 is closed by a radial light intercepting wall 12C and is open at the front end. The inner cylinder 12B is provided on the inner peripheral surface thereof with cam grooves 12d and 12e for front and rear lens groups L1 and L2, respectively.

A linear movement guide ring 14 is fitted in the outer lens barrel 12 such that a rear end of the linear movement guide ring 14 protrudes from the outer lens barrel 12. A linear movement guide plate 15 is secured to the rear end of the linear movement guide ring 14. An inner flange 12f formed at the rear end of the outer lens barrel 12 is rotatably supported between the linear movement guide plate 15 and the linear movement guide ring 14, so that the linear movement guide ring 14 and the outer lens barrel 12 can rotate relatively but move together in the optical axis direction. The linear movement guide plate 15 is provided with radial projections 15a which are fitted in linear movement guide grooves 11b. The guide grooves 11b are formed on the inner peripheral surface of the stationary ring 11 and extend in parallel with the optical axis.

The linear movement guide ring 14 is provided with linear movement guide legs 14a which extend in parallel with the optical axis, so that an inner feed lens barrel (element) 16 which holds the front lens group L1 and a rear lens barrel (element) 17 which holds the rear lens group L2, are linearly guided and moved through the linear movement guide legs 14a, respectively. Specifically, the inner lens barrel 16 is provided with linear movement guide projections 16a which engage with the linear movement guide legs 14a, and the rear lens barrel 17 is provided with linear movement guide projections 17a which engage with other linear movement guide legs 14a. The linear movement guide projections 17a are provided with radially extending cam follower pins 17b which are engaged in the cam grooves 12e of the outer lens barrel 12.

The inner lens barrel 16 has a dual-cylinder structure which is substantially U-shaped in a longitudinal section, having an outer cylinder 16A and an inner cylinder 16B. The front end of the inner lens barrel 16 is closed by a radially extending light intercepting wall 16C and is open at the rear end. The inner lens barrel 16 having the dual-cylinder structure is fitted in the outer lens barrel 12 having the dual-cylinder structure. Namely, the inner cylinder 16B of the inner lens barrel 16, the inner cylinder 12B of the outer lens barrel 12, the outer cylinder 16A of the inner lens barrel 16, and the outer cylinder 12A of the outer lens barrel 12 are concentrically arranged in this order from the inner side (optical axis) With this arrangement, extraneous (harmful) light is prevented from entering the space between the outer lens barrel 12 and the inner lens barrel 16.

The linear movement guide projections 16a extend along the inner peripheral surface of the inner cylinder 16B of the inner lens barrel 16 and project at the rear ends thereof from the inner cylinder 16B. The projections 16a are provided, on the rear ends thereof projecting outward from the inner cylinder 16B, with cam follower pins 16b which are engaged in the cam grooves 12d of the outer lens barrel 12.

The inner lens barrel 16 is provided with a shutter unit mounting ring 16d integral therewith, to which an annular shutter unit 18 is secured. The annular shutter unit 18 is screw-engaged by a front lens barrel 19, at the center portion thereof, to which the front lens barrel 19 (which holds the front lens group L1) is secured. The shutter unit 18 rotates the front lens barrel 19 (front lens group L1) in accordance with object distance data to thereby move the same in the optical axis direction through the screw engagement therebetween, and opens and closes shutter blades SB in accordance with object brightness data, as is well known in the art.

Figure 1:
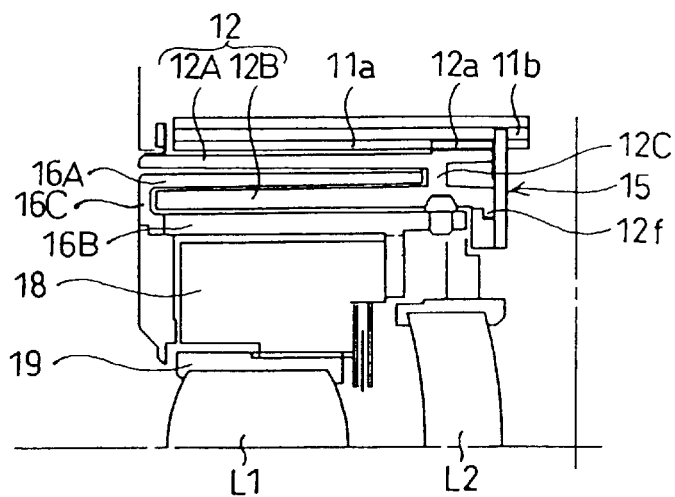
FIG. 1 is a longitudinal sectional view of an upper half of a zoom lens barrel of a zoom compact camera shown in an accommodated position, according to the present invention.
Figure 2:
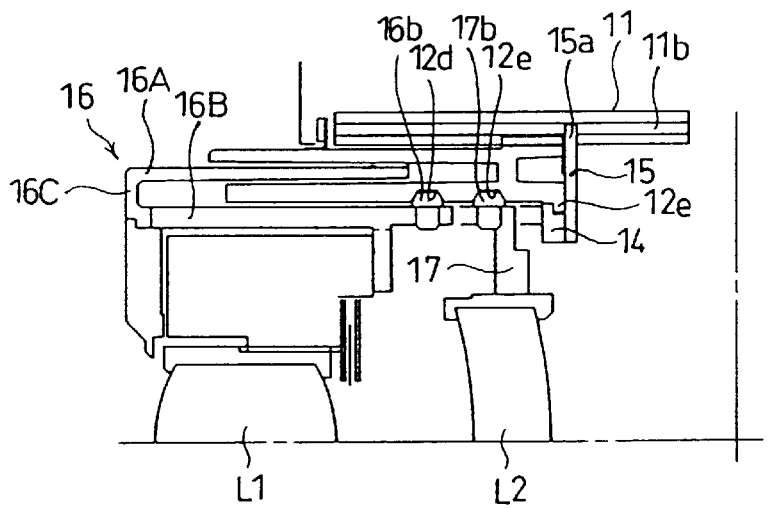
FIG. 2 is a longitudinal sectional view of an upper half of a zoom lens barrel of a zoom compact camera at an intermediate focal length, according to the present invention.
Figure 3:
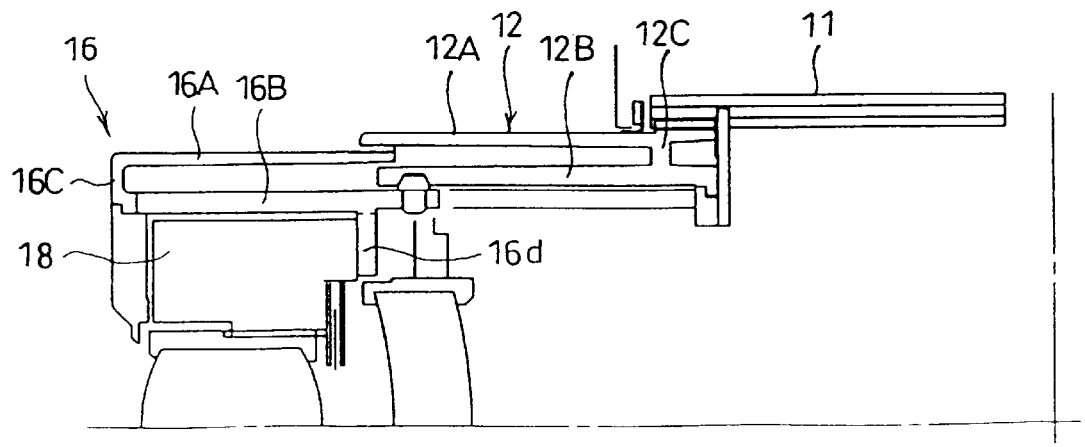
FIG. 3 is a longitudinal sectional view of an upper half of a zoom lens barrel of a zoom compact camera at a longest focal length, according to the present invention.
Figure 4:
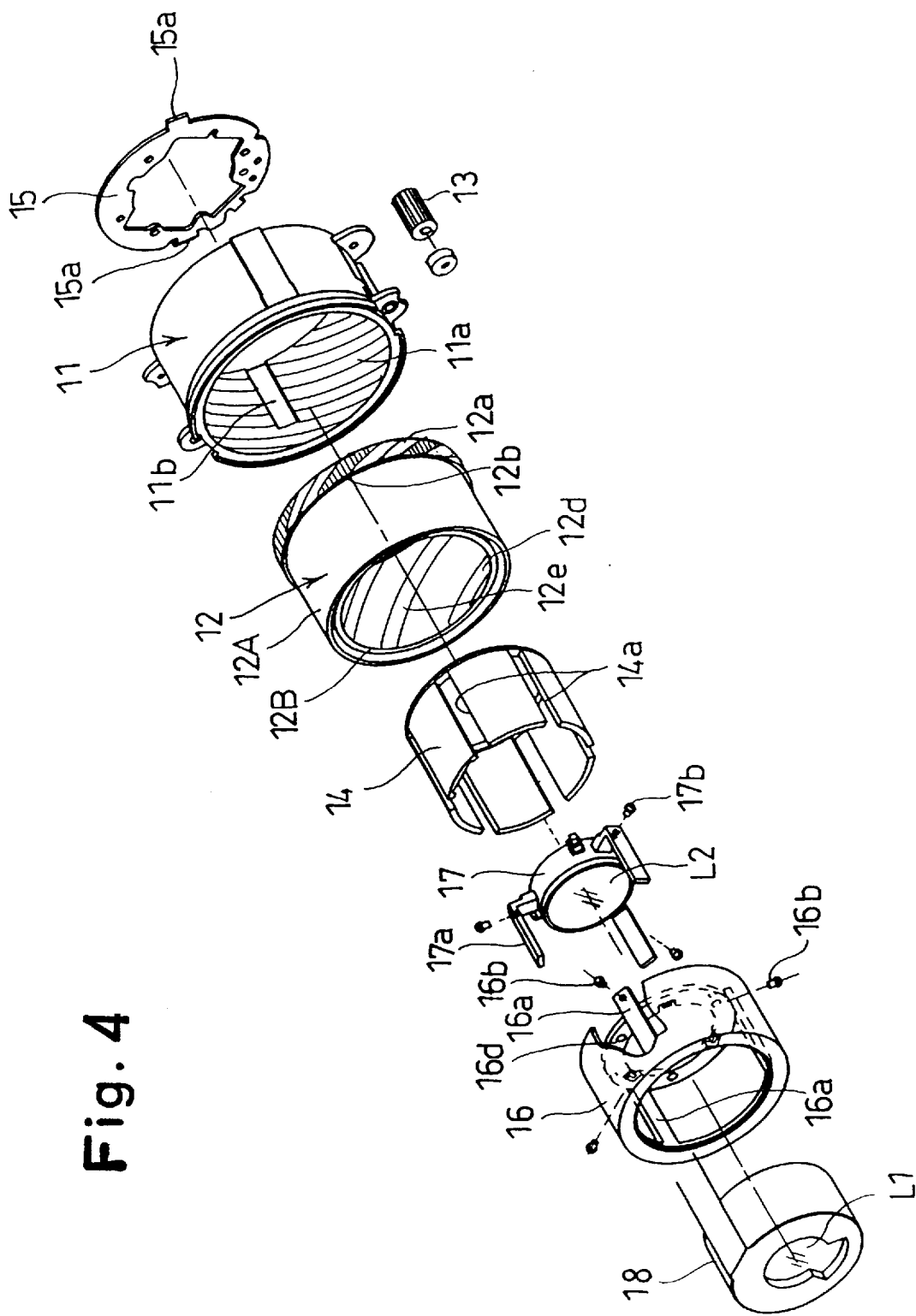
FIG. 4 is an exploded perspective view of a zoom lens barrel of a zoom compact camera, according to the present invention.
Figure 5:
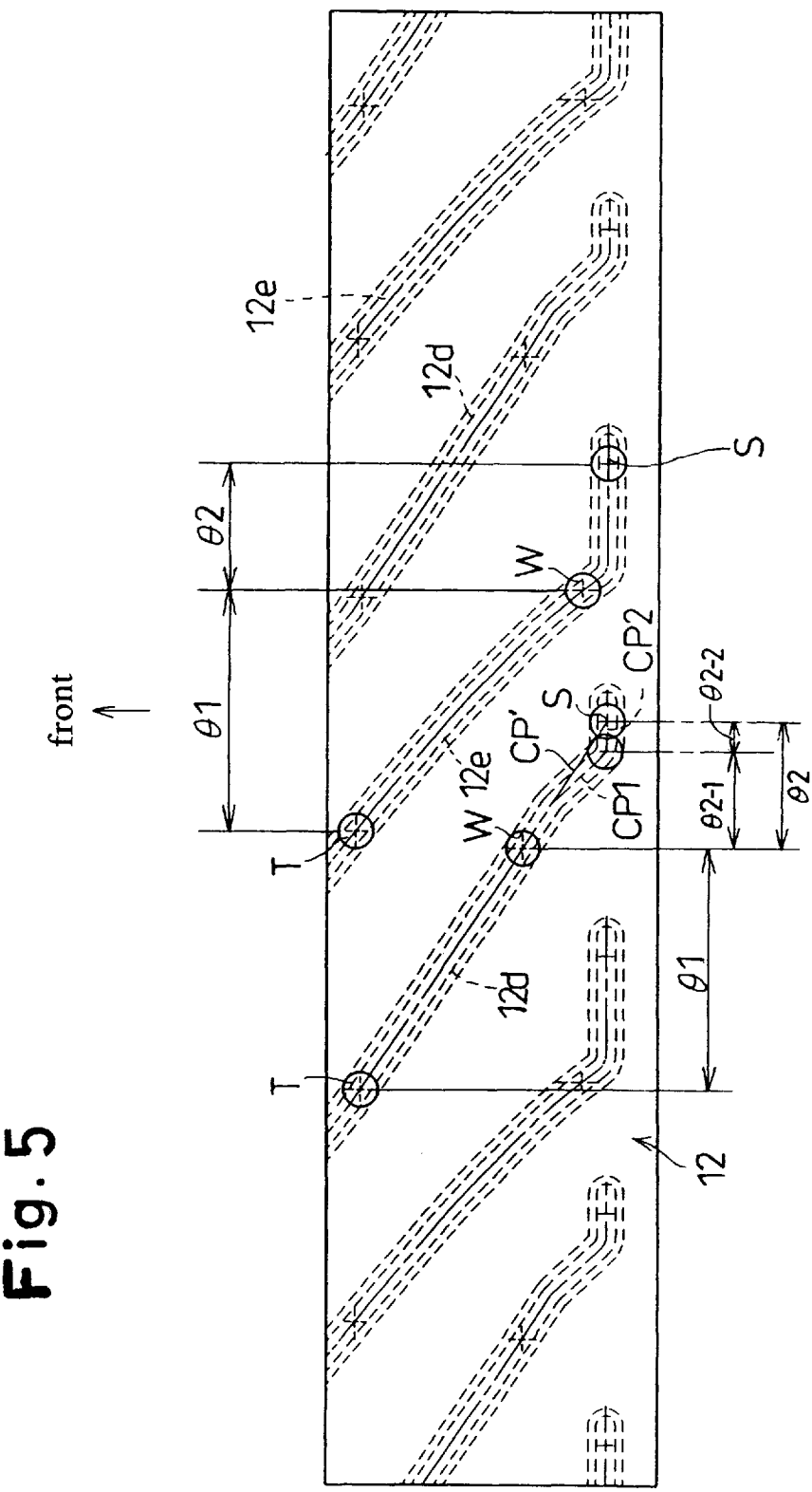
FIG. 5 is a developed view of an outer lens barrel, according to the present invention.

FIG. 5 shows a developed view of the cam grooves 12d and 12e of the outer lens barrel 12 for the front and rear lens groups L1 and L2, respectively. The cam grooves 12d and 12e are each provided with a zoom section θ1 in which the front lens group L1 and the rear lens group L2 are driven between the telephoto extremity T and the wide angle extremity W, and an accommodation section θ2 in which the front lens group L1 and the rear lens group L2 are driven between the wide angle extremity W and the accommodated position S. Moreover, the cam groove 12d for the front lens group L1 is provided with a step eliminating section θ2-1 and an integral accommodation section θ2-2 in the accommodation section θ2. The integral accommodation section θ2-2 extends in the circumferential direction of the ring (outer lens barrel) 12 and in parallel with the corresponding portion of the cam groove 12e for the rear lens group L2. The outer lens barrel 12 is moved in the optical axis direction while rotating, in accordance with the engagement of the helicoids 12a and 11a, and hence the lens barrels 12 and 16 can be moved to the accommodated position in spite of the circumferentially extending accommodation section θ2-2.

In the prior art, the track of the accommodation section θ2 of the cam groove 12d for the front lens group L1, i.e., the track of the accommodation section θ2 of the cam groove 12d, is defined by a straight line CP' connecting the wide angle extremity W and the accommodated position S, so that the step (the difference in the axial length of projection of the lens barrels from the camera body) between front surfaces of the lens barrels 12 and 16 is gradually increased when the lens barrels 12 and 16 are advanced from the accommodated position S.

However, in the present embodiment, a portion CP1 whose gradient is greater (i.e., the axial displacement of the inner lens barrel 16 per unit angular displacement is larger) than the cam track CP', and a portion CP2 (integral accommodation section θ2-2) parallel with the accommodation section θ2 of the cam groove 12e for the rear lens group, are provided instead of the cam track CP'.

The zoom lens barrel having the above construction operates as follows.

When the zoom drive gear 13 is rotated in the forward or reverse direction through the zoom motor, the outer feed lens barrel 12 is rotated in the forward or reverse direction and is moved in the optical axis direction while rotating. The inner cylinder 12B of the cam ring 12 is provided on the inner peripheral surface thereof with the cam grooves 12d and 12e in which the cam follower pins 16b and 17b of the inner lens barrel 16 and the rear lens barrel 17 are engaged, respectively. Since the inner lens barrel 16 and the rear lens barrel 17 are guided by the linear movement guide plate 15, the linear movement guide ring 14, the linear movement guide legs 14a, the linear movement guide projections 16a, and the linear movement guide projections 17a, respectively, the rotation of the outer lens barrel 12 causes the inner lens barrel 16 (front lens group L1) and the rear lens barrel 17 (rear lens group L2) to move in the optical axis direction in accordance with the cam profile of the cam grooves 12d and 12e.

If the outer lens barrel 12 and the inner lens barrel 16 are moved from the telephoto extremity T toward the accommodated position by rotating the outer lens barrel 12, the zooming operation by the front and rear lens groups L1 and L2 is carried out in the zoom sections θ1 of the cam grooves 12d and 12e. When the cam followers 16b and 17b enter the accommodation sections θ2, the inner lens barrel 16 is retracted faster than the outer lens barrel 12 along the cam profile CP1 in the step eliminating section θ2-1, so that the inner lens barrel 16 can be retracted into the outer lens barrel 12. Thus, the step between the inner and outer lens barrels 16 and 12 is eliminated. Thereafter, the inner lens barrel 16 is moved to the accommodated position S in the integral accommodation section θ2-2 (cam profile CP2) together with the outer lens barrel 12 and at the same speed as the outer lens barrel 12.

Figure 7:
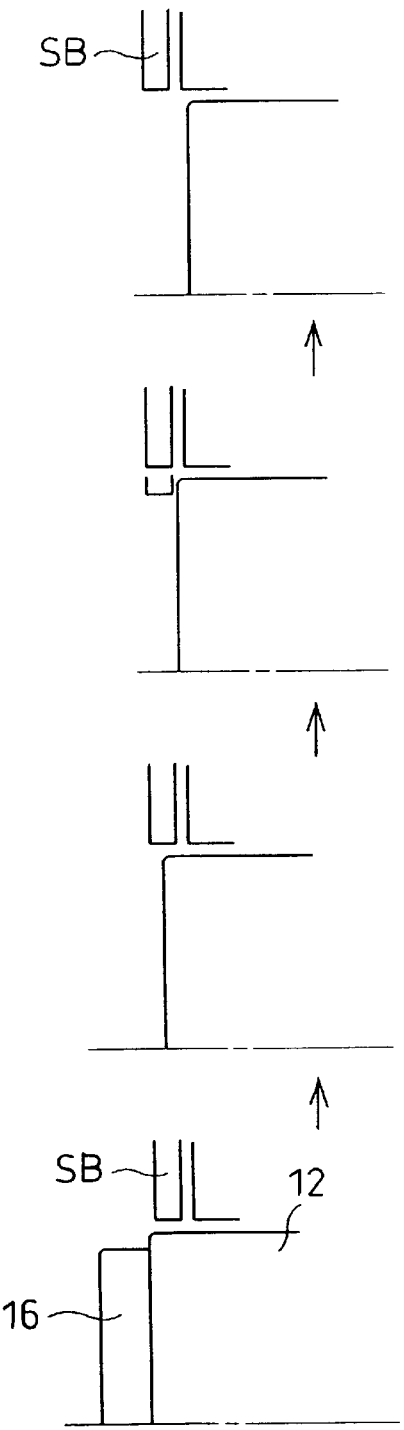
FIG. 7 shows the movements of the lens barrels immediately before the lens barrels reach the accommodated position, according to the present invention; and, FIG. 8 shows the movements of the lens barrels immediately before the lens barrels reach the accommodated position, in the prior art.

FIG. 7 shows the movement of the inner and outer lens barrels 16 and 12 immediately before they reach the accommodated position S. As mentioned above, the inner lens barrel 16 is retracted into the outer lens barrel 12 immediately before reaching the accommodation position S, so that the front surfaces of the inner and outer lens barrels are flush with each other (step eliminating section θ2-1). Thereafter, the inner lens barrel 16 and the outer lens barrel 12 are moved together to the accommodated position S (integral accommodation section θ2-2). If the sliding barrier SB is unlocked, at the position represented by the second stage (the third diagram from the bottom) in FIG. 7, and the sliding barrier SB is forcedly closed, the sliding barrier SB does not interfere or collide with the inner or outer lens barrels 16 and 12.

Figure 8:
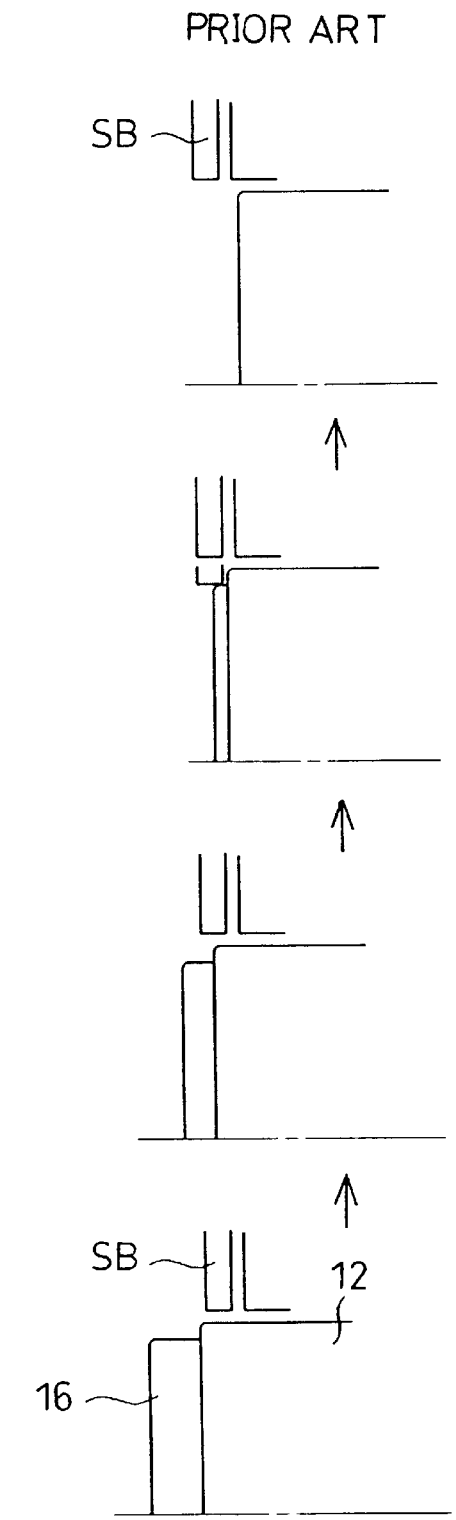

FIG. 8 shows the movement of the inner and outer lens barrels 16 and 12 when the inner lens barrel 16 is retracted using the cam track CP' of the prior art. In the prior art shown in FIG. 8, if the sliding barrier SB is unlocked at the position represented by the second stage (the third diagram from the bottom) in FIG. 8, and the sliding barrier SB is forcedly closed, the sliding barrier SB may interfere or collide with the inner lens barrel 16 which projects forward from the outer lens barrel 12 without being retracted into the outer lens barrel 12.

The above discussion has been directed to the movement of the lens barrels from the advanced position to the retracted position (accommodated position). The movement from the retracted position to the advanced position (wide angle extremity) occurs in the order opposite to the foregoing.

Although the illustrated embodiment is applied to a two-stage advancement type zoom lens having two lens groups, the present invention can be applied to a zoom lens barrel having more than two lens groups.

As can be understood from the above discussion, according to the present invention, an inner feed lens barrel of a plurality of concentric lens feed frames is accommodated in an outer feed lens barrel before the feed lens barrels are completely retracted into the camera body, so that a step between the front surfaces of the feed lens barrels in the axial direction can be eliminated. Consequently, no interference between an element (e.g., a sliding barrier) and the inner lens barrel occurs.

What is claimed is:

1. A lens accommodating method for a zoom compact camera including a plurality of concentric lens barrels which are moved between a retracted position and an advanced position, comprising:

retracting an inner lens barrel into an outer lens barrel before said lens barrels reach said retracted position when said lens barrels are moved from said advanced position toward said retracted position to eliminate a step between front ends of inner and outer lens barrels in an optical axis direction; and moving said inner lens barrel and said outer lens barrel, said front ends being substantially flush with each other, together to said retracted position.

2. A lens accommodating method according to claim 1, wherein said camera includes a sliding barrier which slides to open or close said front ends of said lens barrels when said lens barrels are at said retracted position, and the retracting of said inner lens barrel terminate at a position in which said sliding barrier cannot interfere with said inner lens barrel when said sliding barrier is moved to a closed position before said lens barrels reach said retracted position.

3. A lens accommodating apparatus of a camera, comprising:

a plurality of concentric lens barrels including an inner lens barrel and an outer lens barrel; and a cam ring which comprises cam grooves adapted to control movement of said lens barrels and move said lens barrels between a retracted position and an advanced position, said cam grooves comprising step eliminating sections in which, when said lens barrels are moved from said advanced position to said retracted position, said inner lens barrel is retracted into said outer lens barrel to eliminate a step between front ends of said inner lens barrel and said outer lens barrel in an optical axis direction before said lens barrels reach said retracted position, and integral accommodation sections in which said inner lens barrel and said outer lens barrel are moved to said retracted position while keeping said front ends substantially flush with each other.

4. A lens accommodating apparatus according to claim 3, said camera comprising a sliding barrier which slides to open or close said front ends of said lens barrels when said lens barrels are at said retracted position, said step eliminating sections and said integral accommodation sections of said cam grooves being set such that said sliding barrier cannot interfere with said inner lens barrel when said sliding barrier is moved to a closed position from an open position before said lens barrels reach said retracted position.

5. A lens accommodating apparatus according to claim 3, said cam ring comprising one of said lens barrels.

6. A lens accommodating method in a zoom compact camera including an inner lens barrel and an outer lens barrel which are moved between a retracted position and an advanced position, comprising:

retracting said inner lens barrel into said outer lens barrel before said inner and outer lens barrels reach said retracted position when said inner lens barrel and said outer lens barrel are moved from said advanced position toward said retracted position to eliminate a step between front ends of said inner lens barrel and said outer lens barrel in an optical axis direction; and moving said inner lens barrel and said outer lens barrel, said front ends of which are substantially flush with each other, together to said retracted position.

7. A lens accommodating apparatus, comprising:

an inner lens barrel and an outer lens barrel; and a cam ring which comprises cam grooves adapted to control movement of said inner lens barrel and said outer lens barrel and to move said inner lens barrel and said outer lens barrel between a retracted position and an advanced position, said cam grooves comprising step eliminating sections in which, when said inner and outer lens barrels are moved from said advanced position to said retracted position, said inner lens barrel is retracted into said outer lens barrel to eliminate a step between front ends of said inner lens barrel and said outer lens barrel in an optical axis direction before said inner lens barrel and said outer lens barrel reach said retracted position, and integral accommodation sections in which said inner lens barrel and said outer lens barrel are moved to said retracted position while keeping said front ends substantially flush with each other.

* * * * *